United States Patent [19]

Guarriello et al.

[11] Patent Number: 5,364,675
[45] Date of Patent: Nov. 15, 1994

[54] REVERSE LIP BLOW MOLDED ARTICLE

[76] Inventors: Henry J. Guarriello; Joseph A. Guarriello; Theodore J. Guarriello, all of 9 Woodland Rd., Newtown, Pa. 18940

[21] Appl. No.: 717,736

[22] Filed: Jun. 19, 1991

Related U.S. Application Data

[60] Division of Ser. No. 462,178, Jan. 8, 1990, Pat. No. 5,051,084, which is a continuation-in-part of Ser. No. 265,163, Oct. 31, 1988, Pat. No. 4,972,963.

[51] Int. Cl.$^5$ .................. B65D 1/46; B65D 51/16
[52] U.S. Cl. .................. 428/35.7; 428/36.90; 215/1 C; 47/66; 220/306; 220/366; 220/367; 220/659; 264/527; 264/531; 425/525
[58] Field of Search .............. 264/527, 531, 536, 526, 264/533, 540; 425/525; 220/656, 657, 659, 366, 367, 4.05, 306; 215/1 C; 428/35.7, 36.92; 47/66

[56] References Cited

U.S. PATENT DOCUMENTS

| | | | |
|---|---|---|---|
| D. 255,762 | 7/1980 | Lee et al. | D7/194 |
| D. 255,865 | 7/1980 | Hartman et al. | D7/194 |
| D. 256,682 | 9/1980 | Lee et al. | D11/152 |
| D. 260,751 | 9/1981 | Lee et al. | D11/155 |
| D. 263,017 | 2/1982 | Douglas | D34/11 |
| D. 263,273 | 3/1982 | Douglas | D7/212 |
| D. 269,643 | 7/1983 | Hartman et al. | D34/7 |
| D. 271,247 | 11/1983 | Lee | D34/7 |
| D. 271,818 | 12/1983 | Hartman | D34/11 |
| D. 298,303 | 11/1988 | Lee | D11/152 |
| 2,828,789 | 4/1958 | Groendyk | 220/306 |
| 3,113,571 | 3/1965 | Cserny | 220/366 |
| 3,341,916 | 9/1967 | Peters | 264/98 |
| 3,424,829 | 1/1969 | Peters | 264/531 |
| 3,428,722 | 2/1969 | Chittenden et al. | 264/98 |
| 3,438,538 | 4/1969 | Peters | 220/39 |
| 3,585,681 | 6/1970 | Quigg et al. | 18/5 |
| 3,691,267 | 9/1972 | Takehara | 264/98 |
| 3,711,233 | 1/1973 | Uhlig | 425/302 |
| 3,773,207 | 11/1973 | Dokoupil | 220/367 |
| 3,792,143 | 2/1974 | Branscum et al. | 264/98 |
| 3,934,747 | 1/1976 | Needt | 220/4.05 |
| 3,941,542 | 3/1976 | Uhlig | 425/326 B |
| 3,949,046 | 4/1976 | Procter | 264/296 |
| 3,975,860 | 8/1976 | Harned et al. | 47/38.1 |
| 3,986,805 | 10/1976 | Haines | 425/242 R |
| 4,022,345 | 5/1977 | Butz | 220/71 |
| 4,036,926 | 7/1977 | Chang | 264/94 |
| 4,117,062 | 9/1978 | Uhlig | 264/94 |
| 4,170,623 | 10/1979 | Dubois et al. | 264/534 |
| 4,228,122 | 10/1980 | Hammes | 264/534 |
| 4,228,911 | 10/1980 | Hammes | 220/1 R |
| 4,228,916 | 10/1980 | Weingardt | 220/354 |
| 4,378,328 | 3/1983 | Przytulla | 220/4.05 |
| 4,409,176 | 10/1983 | Jakobsen et al. | 264/527 |
| 4,418,829 | 12/1983 | Clay | 220/657 |
| 4,426,416 | 1/1984 | Jakobsen et al. | 428/36.92 |
| 4,479,751 | 10/1984 | Wyman et al. | 414/406 |
| 4,529,570 | 7/1985 | Przytulla | 264/534 |
| 4,715,144 | 12/1987 | Lee | 47/66 |
| 4,842,802 | 6/1989 | Przytulla | 264/530 |
| 4,878,592 | 11/1989 | Lee | 220/23.83 |
| 4,938,680 | 7/1990 | Guarriello et al. | 425/522 |
| 4,972,963 | 11/1990 | Guarriello | 264/531 |

FOREIGN PATENT DOCUMENTS

| | | |
|---|---|---|
| 0285549 | 10/1988 | European Pat. Off. |
| 1503960 | 12/1967 | France |
| 154033 | 9/1968 | France |
| 2093673A | 9/1982 | United Kingdom |

OTHER PUBLICATIONS

Peters, et al., "High Molecular Weight High Density Polyethlene Powder for Extrusion Blow Molding of Drums and Other Large Parts", 1984.

Primary Examiner—Ellis P. Robinson
Assistant Examiner—Rena L. Dye
Attorney, Agent, or Firm—Seidel, Gonda, Lavorgna & Monaco

[57] ABSTRACT

The present invention is drawn to a blow molded article having a deep recessed lip wherein the lip includes a folded reinforcing layer adjacent a hollow U-shaped portion. The reinforcing layer is formed by the parison folding over on itself in the mold while forming the U-shaped lip. The folded portions are pinched together within the mold and are welded to one another. At various portions around the circumference of the lip, vents are inserted to relieve the pressure within the lip during release of the internal pressure within the molded article.

4 Claims, 6 Drawing Sheets

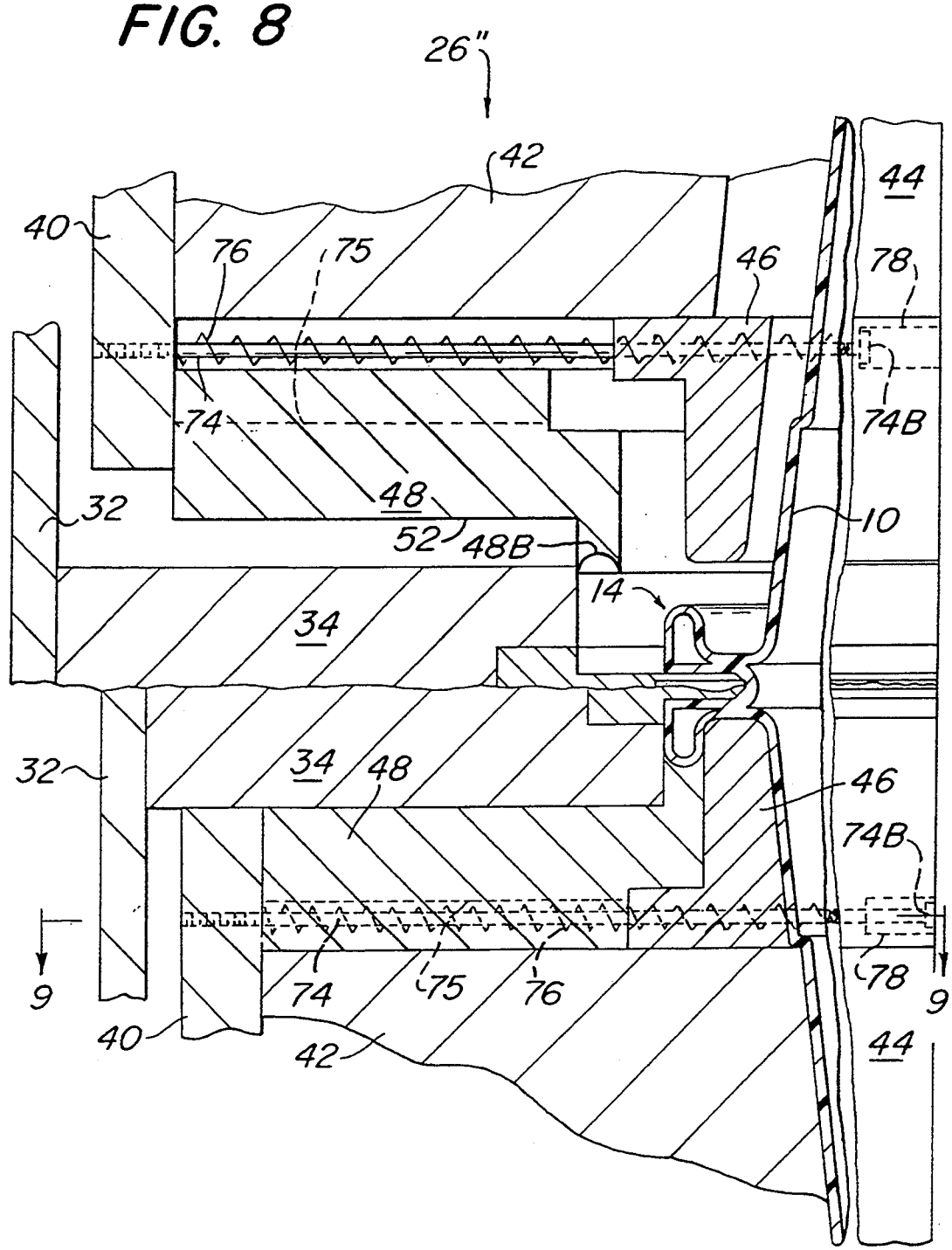

REVERSE LIP BLOW MOLDED ARTICLE

This is a division of co-pending application Ser. No. 07/462,178, filed Jan. 8, 1990 which is now U.S. Pat. No. 5,051,084, which is a continuation-in-part of application Ser. No. 07/265,163, filed Oct. 31, 1988, which is now U.S. Pat. No. 4,972,963. The subject matter of this U.S. Pat. No. 4,972,963 is herein incorporated by reference.

FIELD OF THE INVENTION

The present invention is directed to blow molded plastic articles, and is specifically directed to an apparatus and method which forms a deep recessed or reverse lip in a blow molded article.

BACKGROUND OF THE INVENTION

The term "recessed lip" or "reversed lip" as used herein refers to a generally U-shaped hollow member which is formed at the upper open edge of an article. The lip is provided to increase the rigidity and integrity of the article.

The molding of a deep recessed lip into a plastic article has traditionally been achieved through the use of injection molding. Blow molding techniques have also been used to form a recessed lip in an article. Prior blow molding apparatus typically comprise two horizontally reciprocally movable mold halves which are arranged symmetrically about a vertical plane. Each mold half is a mirror image of the other. Each mold half may also be divided by a horizontal plane into two vertically reciprocally movable sections. A mold of this type is used to simultaneously form two articles which may be separated upon formation.

The blow molding process is initiated with all the mold parts separated from one another. A parison or tube of plastic is extruded around a blow tube between the reciprocally movable mold halves. The parison is typically polyethylene, although any thermoplastic which is blow moldable may be used. A polyethylene parison is typically extruded at a temperature of about 375° F. The mold halves are moved horizontally toward one another. Pinch-off edges make a seal for the parison within the mold and prepare the flash for easy removal. The parison within the mold is then inflated or pressurized with air between about 60 and 150 psi. The parison is expanded into contact with the inner surface of the mold cavity. A portion of the mold is formed radially outwardly of the mold cavity that forms the main body of the article. The parison is pushed into the interior of the outward portions and forms the lip on the article. Thereafter, the air pressure in the mold cavity may be lowered to about 5 to 40 psi.

The mold cavity is also provided with sections that move vertically toward one another so as to further define the lip. Such an apparatus is described in co-pending application Ser. No. 07/265,163. As the mold sections are pushed together, the outwardly extending portions of the lip are compressed. Further apparatus include moveable mold sections that placed the outwardly extending portions into an over lapping condition. Such an apparatus is described in U.S. Pat. No. 4,378,328.

The entire series of movements of the various mold sections occurs rapidly, i.e., typically in less than two seconds. Once the internal pressure is withdrawn from the mold cavity, plates on the upper and lower portion of the molding apparatus retract away from the molded article in a horizontal direction. The mold sections then move in a vertical direction away from one another and the article is removed from the mold apparatus.

In some instances, the parison forming the lip buckles and then solidifies. This causes undesirable stretching in certain areas of the lip and reduces the strength of the lip. The present invention provides the capability for producing an article with a sturdy reverse lip without undesirable stretching, which lowers the mechanical strength and integrity of the lip.

SUMMARY OF THE INVENTION

The present invention is directed to blow molding a deep recessed lip in a molded article. The lip as contemplated by the present invention includes a folded reinforcing layer adjacent a hollow U-shaped portion. The reinforcing layer is formed by the parison folding over on itself in the mold while forming the U-shaped lip. The folded portions are pinched together within the mold and are welded to one-another. At various portions around the circumference of the lip, vents are inserted to relieve the pressure within the lip during release of the internal pressure within the molded article.

The present invention also contemplates an apparatus and method of forming a deep recessed lip in a blow molded article. The apparatus includes a plurality of levers to synchronize the movement of the mold parts to form the lip and to form the reinforcing layer adjacent the lip. The synchronous movement of the mold parts results in better distribution of the parison in the lip area and prevents the parison from bunching or wrinkling on the radially outer portion of the lip.

Another portion of the present invention includes structure for the synchronous separation of the mold parts once the molding process is complete. The mold sections move simultaneously both vertically and horizontally. The relative movement of the mold sections away from the lip area is controlled to maintain the integrity of the lip during the separation. This relative movement, in conjunction with the simultaneous vertical and horizontal separation of the mold halves, results is a faster production rate and a reduction in the number of actuators needed to support the mold.

DESCRIPTION OF THE DRAWINGS

For the purpose of illustrating the invention, there is shown in the drawings a form which is presently preferred; it being understood, however, that this invention is not limited to the precise arrangements and instrumentality shown.

FIG. 8 is a second cross section of the molding apparatus shown in FIG. 7.

DESCRIPTION OF THE INVENTION

Figure 1:
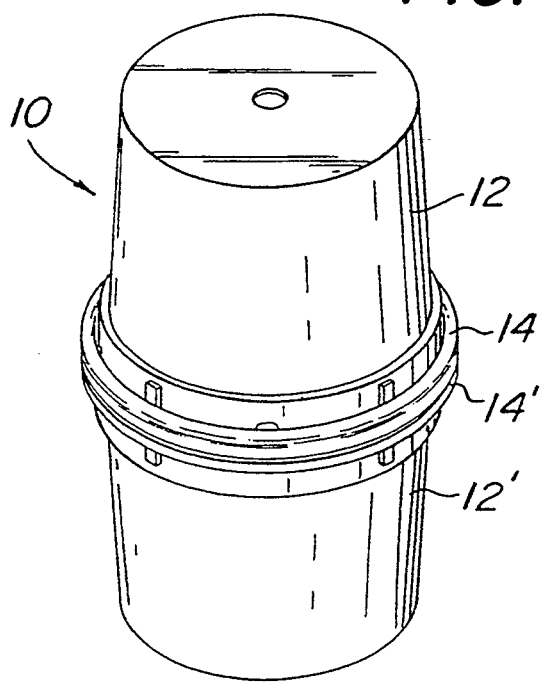
FIG. 1 is an isometric view of a molded article made in accordance with the present invention.
Figure 2:
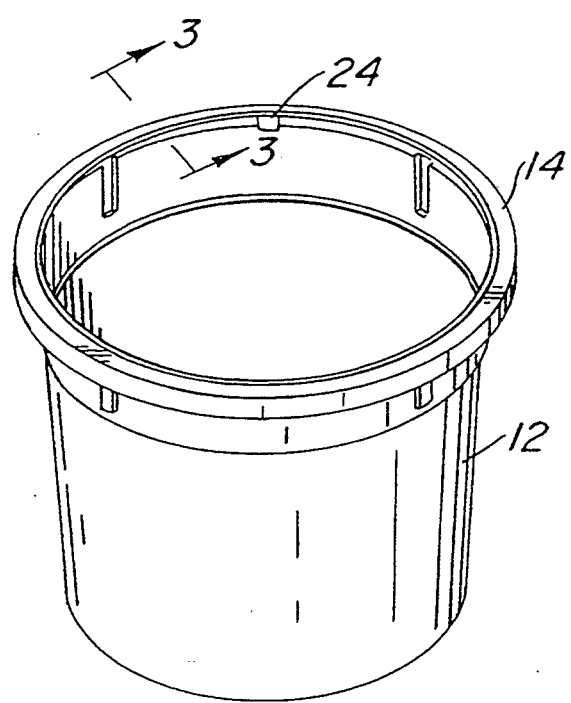
FIG. 2 is an isometric view of one half of the molded article shown in FIG. 1 having a deep recessed or reverse lip made in accordance with the present invention.

Referring now to the drawings, wherein like numerals indicate like elements, there is shown in FIG. 1 an article 10 in accordance with the present invention. Article 10 is, for example, in the form of two containers 12 and 12' which are simultaneously molded during a single molding operation. The two containers 12 and 12' are joined together adjacent lips 14 and 14'. As illustrated in FIG. 2, article 10 is separated, e.g., cut along a transverse plane substantially through its middle, such that containers 12 and 12' are of equal dimension and the lips 14 and 14' form the periphery of the open upper end thereof.

Figure 3:
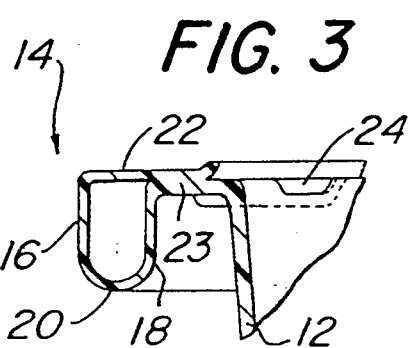
FIG. 3 is a partial cross section of the article as taken along lines 3—3 in FIG. 2.

The recessed lip 14 as contemplated by the present invention is shown in cross-section in FIG. 3. Recessed lip 14 includes a generally U-shaped hollow member with an inner wall 18, an outer wall 16, and a curved lower wall 20. An upper wall 22 is formed over the U-shape by a layer of plastic folded inwardly toward the center of the container 12. The upper wall 22 is folded over the extension flange 23 between the body of the container 12 and the U-shaped portion. The folding over of wall 22 and flange 23 serves to increase the mechanical strength of the lip 14 and container 12. The lip 14 is provided with at least one vent 24 to allow pressurized air to escape from the hollow of the lip 14 and prevent the lip 14 from exploding after release of pressure within the mold during the molding process.

Figure 4:
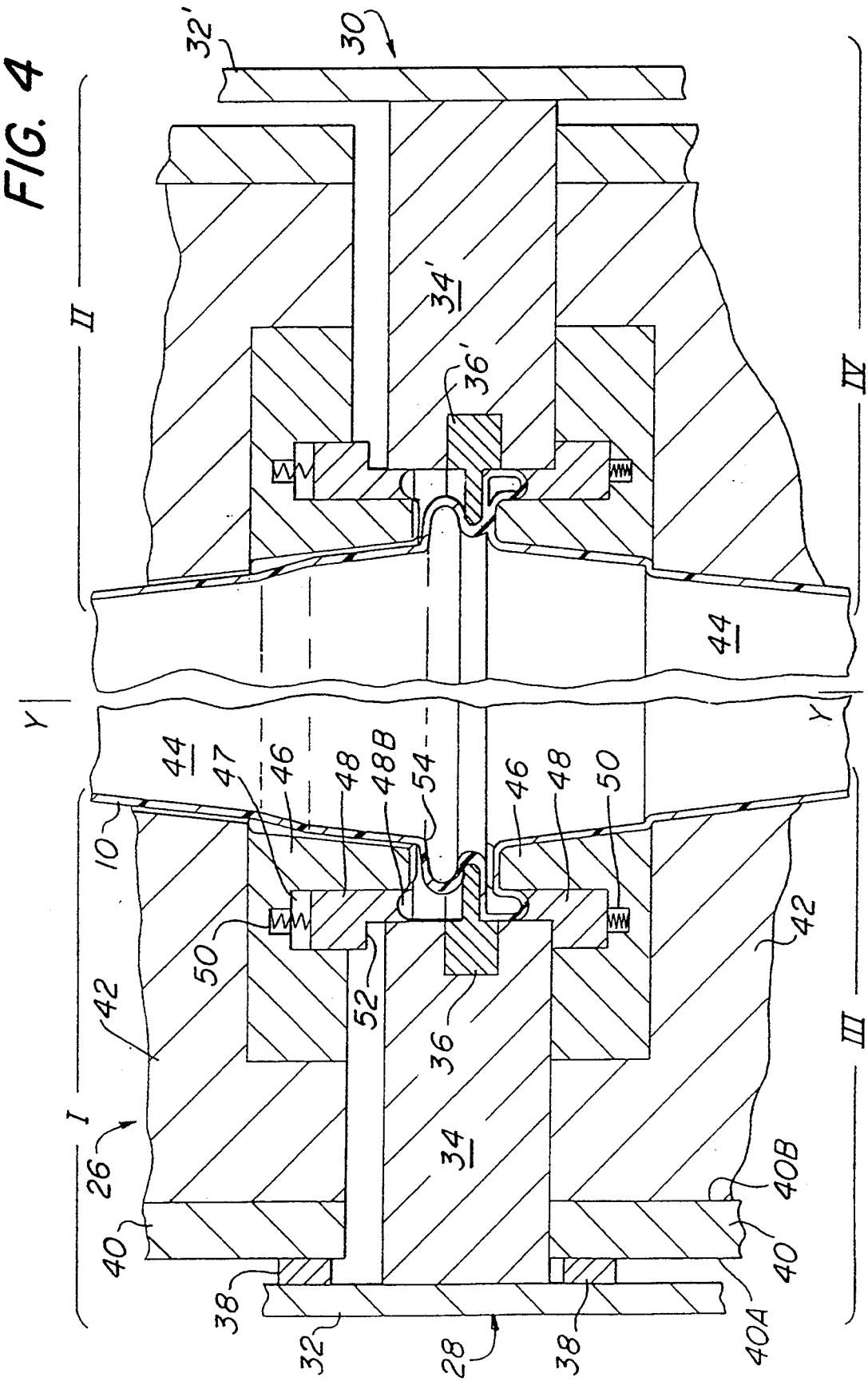
FIG. 4 is a partial cross section of a molding apparatus of the present invention.

FIG. 4 illustrates a first embodiment of a molding apparatus 26 in accordance with the present invention. Apparatus 26 comprises two reciprocally movable mold halves 28 and 30. Left mold half 28 and right mold half 30 are arranged symmetrically on opposite sides of vertical plane Y—Y. Mold half 28 is a mirror image of mold half 30. Each mold half 28 and 30 includes two vertically reciprocally movable sections. Mold half 28 comprises Sections I and III. Mold half 30 comprises Sections II and IV. Each mold half section is positioned on opposite sides of a center ring member 34 and 34', respectively. When the mold sections are closed (as illustrated, Sections III and IV), they define the shape of article 10. Mold half 28 will be described in detail below. Those skilled in the art will understand that this description applies equally well to mold half 30.

Mold half 28 includes a plate 32. Center ring member 34 is fixed perpendicular to plate 32 and perpendicular to plane Y—Y. Center ring member 34 includes a separating member 36 which projects inwardly toward the center of the molding apparatus 26. Plate 32 is moveable horizontally. Sections I and III of mold 28 are slidably mounted on plate 32 via linear thrust bearings 38.

Mold Sections I and III include a movable plate 40 having a surface 40A that rides on bearings 38. Plate 40 is capable of reciprocal movement toward and away from ring 34. Mold wall 42 is rigidly fixed to plate 40 along surface 40B. Plate 40 can be eliminated in which case mold wall 42 would be slidably mounted directly on the bearings 38. Lower and upper pinch-off plates (not shown) are fixed to the upper and lower surface of mold walls 42 of Sections I and III, respectively. The pinch-off plates are reciprocally movable perpendicular to the vertical Y—Y plane, toward and away from the center of the mold 26. The pinch-off plates cooperate to form a cylindrical bore at the base of the mold and provides clearance for flash from the parison and for the blow tube (not shown). The bottom pinch-off plates also include clearance on their inner surfaces for excess plastic extruded during the molding process. When mold halves 28 and 30 are moved together, the pinch-off plates form a tight seal about the blow tube. Mold walls 42 and 42' and pinch-off plates together define a cavity 44 defined as two frusto-conical forms which, when brought together, define the shape of article 10. Of course, if a different shape is desired, the shape of the cavity 44 will correspond to the desired shape.

A first insert member 46 is positioned within a recesses in the mold wall 42 proximal to center ring member 34. First insert member 46 forms the upper end of container 12 adjacent lip 14. First insert member 46 includes a channel 47 into which is placed a second insert member 48. First insert member 46 is preferably made of steel, but any metal with the properties similar to those of steel will suffice. Second insert member 48 is reciprocally movable within the channel 47 in the Y—Y direction. The first insert member 46 and is biased away from the interior of the channel 47 by coil springs 50 (only one spring 50 being shown for each mold section). Second insert member 48 is preferably made of bronze, but any metal having properties similar to those of bronze in relation to the materials of the first insert member 46 will suffice. Second insert member 48 is L-shaped in cross-section and is reciprocally slidable between a first position (Section I) and a second position (Section III). The L-shape forms a shoulder 52. Springs 50 bias second insert member 48 to the first position, i.e., out of the channel in ring member 46 when the mold is separated. Springs 50 maintain second insert member 48 in its projected position until the movement of the mold sections causes engagement of shoulder 52 with ring member 34.

Parison 54 when pressurized within the mold cavity 44 engages the projected concave surface 48B of second insert 48. Thereafter, first insert 46 and second insert 48 initiate their movement toward the center ring member 34. Upon engagement of the shoulder 52 of second insert 48 with ring member 34, the first insert 46 continues to move toward ring member 34 and separating member 36. This relative movement of the mold sections causes the parison 54 to form the hollow U-shaped lip 14 (see Section III). The relative spacing between the projection of separating member 36 and the vertical projection of first insert 46 is controlled to permit the overlap of flange 23 and upper wall 22 by the lip 14. This relationship is illustrated in Sections II and IV. Preferably these two portions weld together and seal the hollow of the U-shape. As illustrated by Section I and III, the vertical projection of first insert member may be reduced so as to provide a gap between the formation of the upper wall 22 and the flange 23. This gap forms the vent 24 in the lip 14 area for release of pressure within the lip hollow during release of pressure in the mold cavity 44. During the separation of the parts of apparatus 26, the relative movement thereof is opposite that in forming the article 10.

Figure 5:
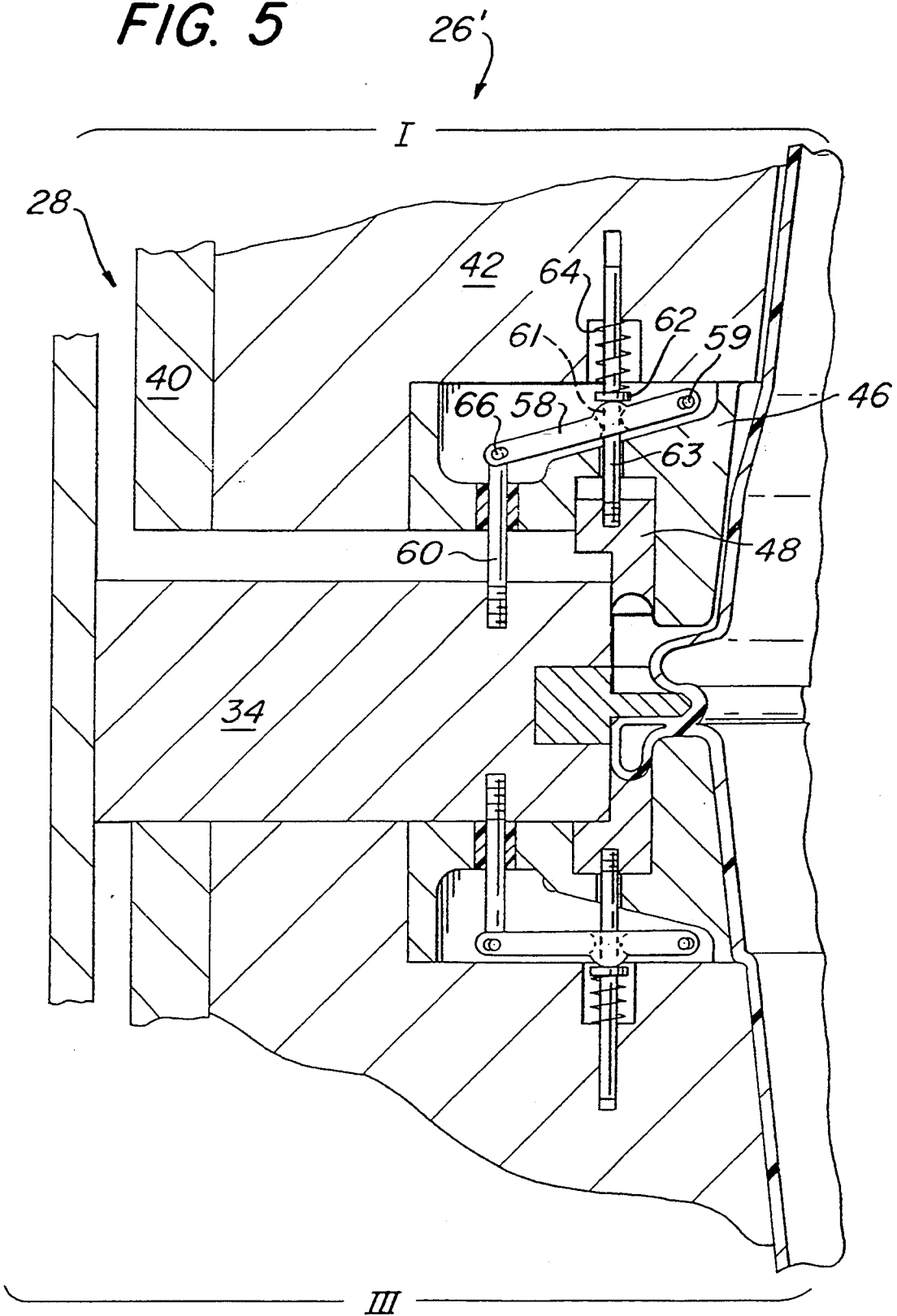
FIG. 5 is a partial cross section of a second embodiment of a molding apparatus of the present invention.

FIG. 5 illustrates a second embodiment of the molding apparatus 26' as contemplated by the present invention. In FIG. 5, only Sections I and III of mold part 28 have been illustrated. The apparatus 26' shown in this FIG. 5 includes a lever mechanism 58 to synchronize to formation of the lip 14. One end of lever 58 is fixed to the first insert member 46 at pivot 59. The opposite end of lever 58 is connected to push rod 60 at pivot 66. Push rod 60 as shown is attached by screw threads to center ring member 34. However, due to the force of spring 64, the push rod 60 need only contact center ring 34 for proper synchronization of the movement of inserts 46 and 48. Along the length of the lever 58 is a contact projection 61. Contact projection 61 rids on flange 62. Flange 62 projects from a shaft 63 which is fixed at one end to second insert member 48. The opposite end of shaft 63 is mounted in mold wall 42. Shaft 63 is biased toward center ring 34 by spring 64 such that the flange 62 normally engages projection 61 on lever 58.

In the operation of this second embodiment 26', the vertical movement of the mold parts 40 and 42 toward the center ring member 34 causes a relative movement between the first insert member 46 and second insert 48. The relative speed of these parts is determined by the position of the projection 61 between pivots 59 and 66. As will be discussed further below, the placement of the projection 61, and its corresponding contact with flange 62, is preferably at a distance from pivot 59 that is less than one half of the length of the lever 58. Thus, first insert 46 will move toward ring member 34 at a speed less than twice that of the second insert member 48. However, both members reach center ring member 34 at substantially the same time.

Figure 6:
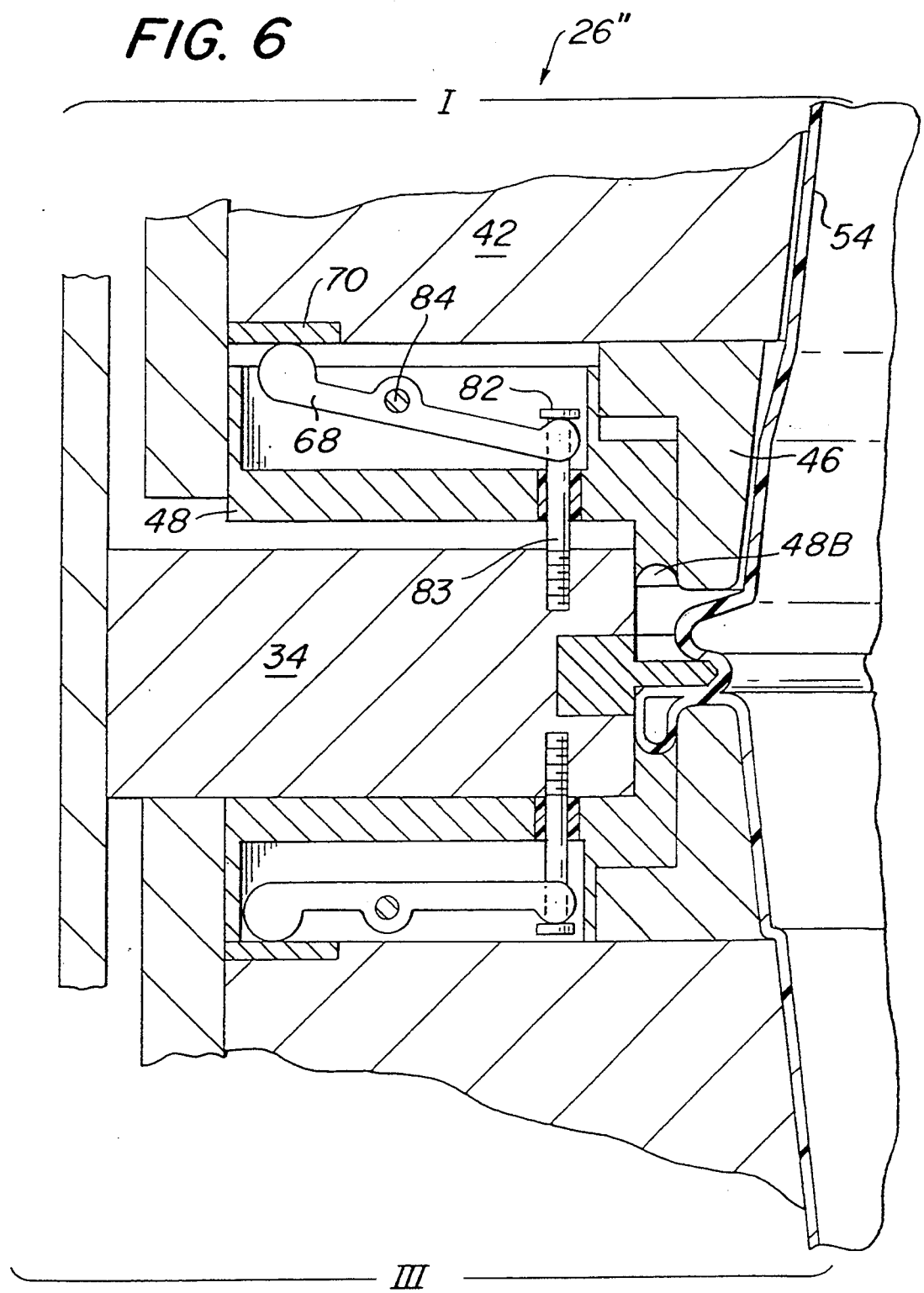
FIG. 6 is a cross section of a third embodiment of a molding apparatus of the present invention.
Figure 7:
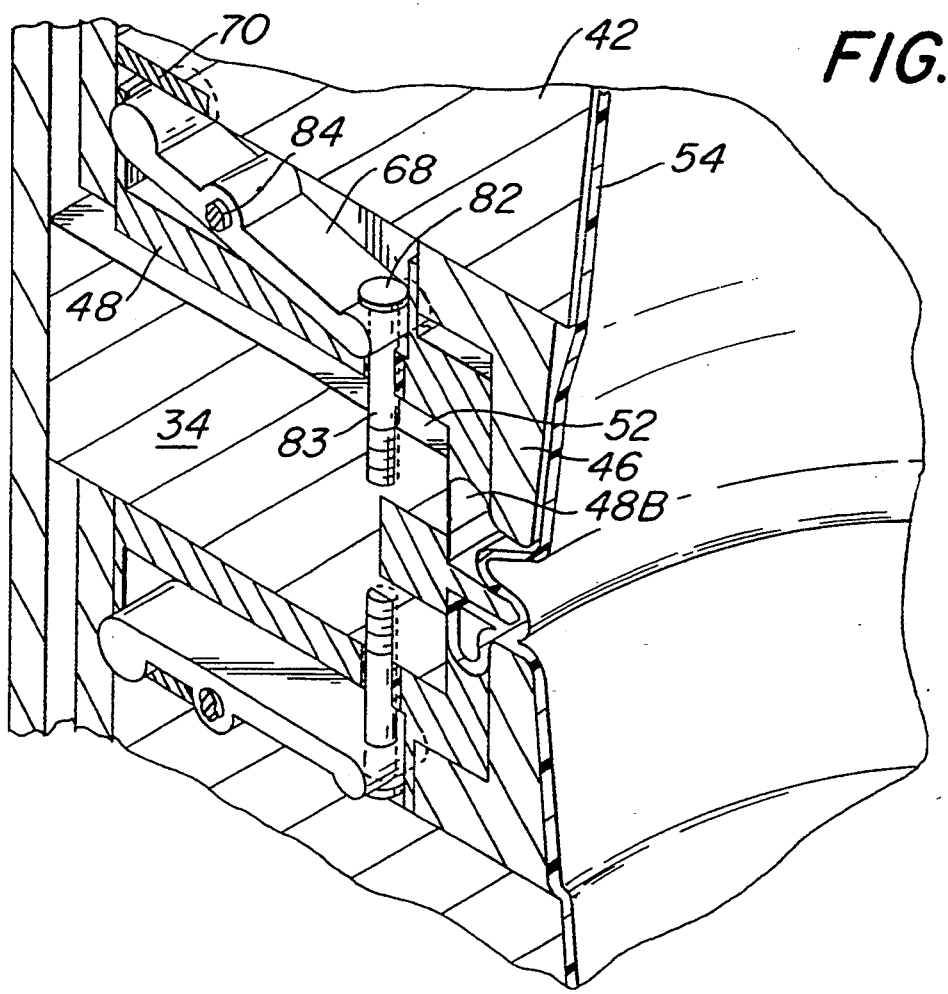
FIG. 7 is an isometric cross section of the molding apparatus shown in FIG. 6.

Illustrated in FIGS. 6 and 7 is another alternate embodiment of a molding apparatus 26''. This third embodiment includes a synchronized movement of the mold parts that is similar to that accomplished by apparatus 26' in FIG. 5. In this alternate embodiment, one end of lever 68 contacts wear plate 70 on mold part 42. The opposite end of lever 68 contacts flange 82. Flange 82 is formed at one end of shaft 83. The opposite end of shaft 83 is fixed to center ring 34. Lever 68 is pivoted to second insert member 48 at pivot 84. The placement of pivot 84 is determined by the desired relative speed of the first insert 46 as compared to the second insert 48. Since the speed of second insert 48 is desired to be greater than one half the speed of first insert 46, the pivot should preferably be located no greater than one half the length of the lever 68 from the end thereof contacting wear plate 70 on mold part 42.

The synchronous movement of first insert 46 and second insert 48, as contemplated by the embodiments of the molding apparatus shown in FIG. 5 and FIGS. 6 and 7, controls the flow of the parison 54 in the formation of the lip portion 14 of container 12. The relative movement of the mold parts allows the parison 54 to be rolled around the concave surface 48B on second insert 48. Control of this relative speed results in an even distribution of the parison 54 in the lip 14, particularly in the area of inner wall 18.

In the embodiment of molding apparatus 26 shown in FIG. 4, the inner wall 18 of lip 14 may become somewhat elongated, and thus thinner, as compared to the other portions 16, 20, and 22 of the lip 14. This thinned area is caused by a stretching of the inner wall 18 area due to the relative progression of first insert 46 as compared to second insert 48. In the alternate embodiments 26' and 26'', the relative speed of the inserts 46 and 48 cause the compression of the outer wall 16 without bunching and without the inner wall 18 becoming stretched. The arrival of the parts 46 and 48 into the desired position to form lip 14 is substantially simultaneous due to the relative speed of insert 48 being greater than one half of the speed of insert 46. This relative movement results in a lip 14 which is substantially uniform in formation and which does not include weakened areas resulting from wrinkled or improperly hardened plastic. For these reasons, these alternate embodiments 26' and 26'' are preferred.

Figure 9:
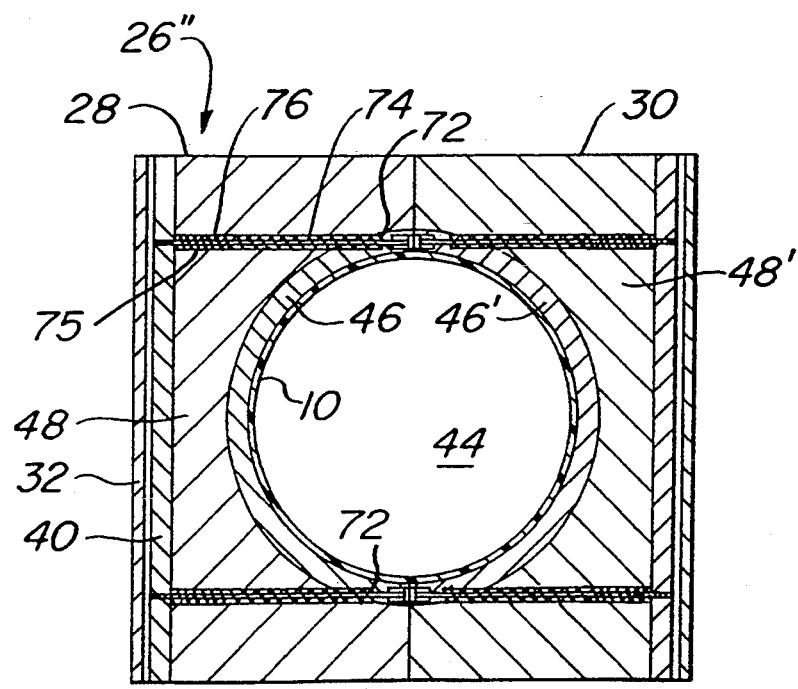
FIG. 9 is a cross section of the molding apparatus of FIG. 8 taken along line 8—8.

FIGS. 8 and 9 illustrate means for releasing the molding apparatus 26'' once the article 10 has been molded. In this embodiment, when the parison 54 is cooled, plates 32 and 40, mold wall 42, and center member 34 move in a horizontal direction away from the cavity 44. At the same time, mold wall 42 moves in a vertical direction away from center member 34. When the mold is closed, the shoulder 52 of second insert member 48 in this embodiment is in direct contact with center member 34. Also, the projection of first insert member 46 must clear the lower wall 20 of the lip 14 prior to its horizontal movement. For this purpose, a spring bolt 74 is placed in a channel 75 which extends through second insert 48 and terminates within first insert 46. A spring 76 is placed in channel 75. Spring 76 extends between plate 40 and an internal limit stop 72 within first insert member 46. The opposite end of spring bolt 74 includes a bolt head 74B which is retained within passageway 78 in insert 46. Passageway 78 provides for limited movement of the bolt head 74B upon horizontal movement of the plate 40. Thus, as mold parts 34, 40 and 42 move horizontally, the compressed spring 76 keeps first members 46 from moving in the horizontal direction until bolt head 74B reaches the internal limit of passageway 78. However, insert portions 46 and 48 of the mold are free to move vertically with the mold wall 42. When bolt head 74B reaches the end of passageway 78, inserts 46 and 48 move horizontally with parts 40 and 42. This occurs after the projections of inserts 46 and 48 have cleared the lip 14. This relationship of the mold part movement permits the reduction in the number of actuators required for mold separation and increases the number of cycles that the apparatus 26'' may perform in a given amount of time.

The present invention may be embodied in other specific forms without departing from the spirit or essential attributes thereof and, accordingly, reference should be made to the appended claims, rather than to the foregoing specification, as indicating the scope of the invention.

We claim:

1. An article made using a blow molding process, the article comprising: a substantially circular side wall; a bottom wall; an open top end; and a projecting lip positioned on the outer circumference of the circular side wall adjacent the open top end, the lip formed by a web portion extending outwardly from the periphery of the side wall, a recessed portion having a substantially U-shaped cross-section, and a layer of material folded inwardly over the U-shaped recessed portion and adjacent the web portion, said layer of material is welded to the web portion, enclosing the U-shaped portion, and the article having at least one vent into the enclosed U-shaped portion of the lip.

2. An article produced by a method of blow molding a deep recessed portion onto a molded part comprising the steps of: providing a molding apparatus having at least a first and second mold sections adapted to move toward a fixed member during a portion of the molding process; extruding a parison into a mold cavity within the molding apparatus; closing the molding apparatus and sealing the parison airtight within the cavity; pressurizing the parison and thereby forcing a portion of the parison into engagement with the mold cavity; moving the first mold section and the second mold section at a controlled rate of speed relative to one another toward the fixed member wherein the movement of the second mold section is at a speed at least half the speed of the first mold section and the first mold section and the second section reach their final mold forming position with respect to the fixed member at substantially the same time so as to evenly distribute the parison within an area defined by the movable mold sections and forming a lip having an outwardly extending rim, a U-shaped portion and a layer covering the U-shaped portion; the outwardly extending rim welded to the layer covering the U-shaped portion and the article having a vent formed into the defined area by the movement of the movable mold sections relative to the fixed member; the vent relieving pressure from inside the defined area into the mold cavity; moving the mold sections away from one another; and removing the formed article from the cavity.

3. An article produced by a method of blow molding a deep recessed portion onto a molded part comprising the steps of: providing a molding apparatus having at least two mold sections adapted to move toward a fixed member during a portion of the molding process; extruding a parison into a mold cavity within the molding apparatus; closing the molding apparatus and sealing the parison airtight within the cavity; pressurizing the parison and thereby forcing a portion of the parison into engagement with the mold cavity; moving the first mold section and the second mold section at a controlled rate of speed relative to one another toward the fixed member so as to evenly distribute the parison within an area defined by the movable mold sections and forming a lip having an outwardly extending rim, a U-shaped portion and a layer covering the U-shaped portion, the outwardly extending rim welded to the layer covering the U-shaped portion, and the article having a vent formed into the defined area by the movement of the movable mold sections relative to the fixed member; depressurizing the parison from inside the defined area through the vent into the mold cavity; moving the mold sections away from one another; and removing the formed article from the cavity.

4. An article produced by the method as claimed in claim 3 wherein the movement of the second mold section is at a speed at least half the speed of the first mold section so as to cause the parison to be evenly distributed within the defined area of the movable mold sections.

* * * * *